Oct. 25, 1955
H. MALM
2,721,375
HANDGRIP FOR HAND TOOLS
Filed Aug. 7, 1953
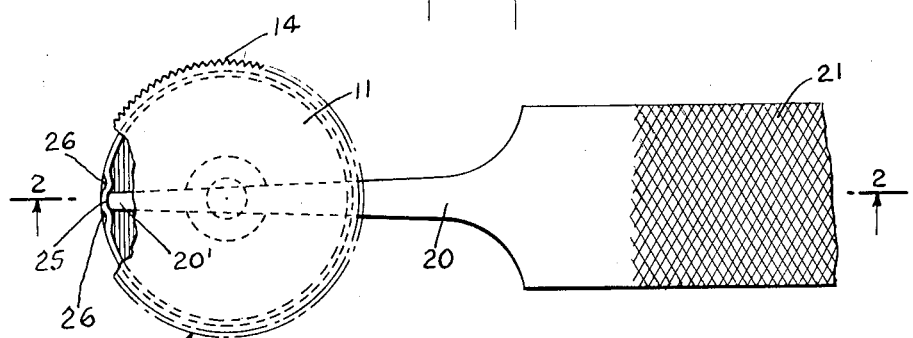
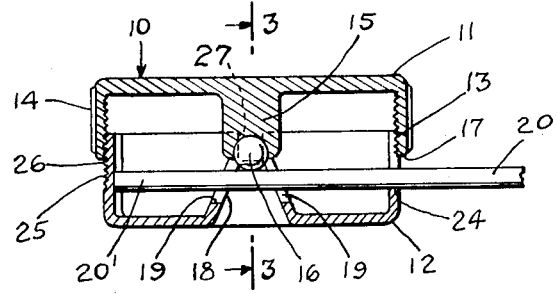
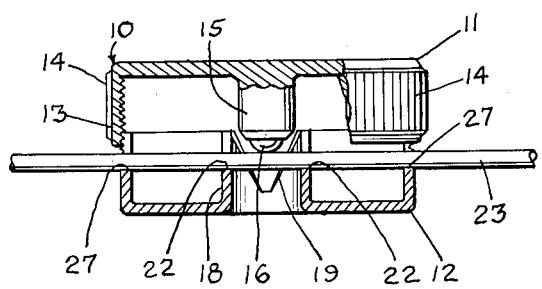
INVENTOR
HENRY MALM
BY
*Howard C. Thompson*
ATTORNEY

2,721,375

HANDGRIP FOR HAND TOOLS

Henry Malm, Stony Brook, N. Y.

Application August 7, 1953, Serial No. 372,900

9 Claims. (Cl. 29—80)

This invention relates to a handgrip for use in connection with various types and kinds of tools, which are held in the hand in the use thereof such, for example, as files. More particularly, the invention deals with a handgrip in the form of relatively movable parts facilitating the quick detachable mounting of the grip on the shank or handle portion of a tool.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a plan view showing one of my improved handgrips as applied to a file, part of the construction being broken away and in section.

Fig. 2 is a partial section on the line 2—2 of Fig. 1; and

Fig. 3 is a section on the line 3—3 of Fig. 2 showing a modified use of the handgrip.

In practice, I provide a handgrip 10 in the form of a relatively thick disc or cuplike body, composed of top and bottom parts 11 and 12, respectively, the part 11 being of greater diameter than the part 12, the parts having interengaging threads, as seen at 13, for adjustment toward and from each other. The part 11 has a circumferential milling, as noted at 14 in Fig. 3 of the drawing to provide a gripping surface facilitating coupling and uncoupling of the parts.

The part 11 has, centrally of its inner surface, a depending stud 15, in the lower end of which is secured a bearing ball 16. The bearing ball 16 protrudes slightly beyond the lower edge 17 of the part 11.

The part 12 has, centrally of the bottom wall thereof, an inwardly extending bearing or jaw portion 18, generally tubular in form and having opposed V-shaped grooves 19 adapted to receive shanks of tools of various kinds and classes such, for example, as the shank 20 of the file 21 shown in part in Fig. 1 of the drawing.

At right angles to the V-shaped grooves 19, the bearing jaws have, at their upper surfaces, recesses 22 to receive shank portions 23 of other types of tools, the latter usually being rectangular in cross-sectional form. Tools of the type and kind having the shanks 23 usually have opposed working or preshaped ends for performing various types and kinds of operations on workpieces, whereas other tools, like the tool shown at 21 in Fig. 1 of the drawing, have a shank or handle portion at one end.

Considering Figs. 1 and 2 of the drawing, it will appear that the outer wall of the bottom part 12 has an aperture 24 for receiving the shank 20; whereas the opposed wall is fashioned to form a key socket 25, in connection with which the end 20' of the shank 20 is adapted to seat. The key socket 25 is formed by inwardly pressed ribs 26 which extend to the upper open end of the part 12, so as to accommodate shanks of different sizes.

In engaging the shank 20, the end 20' is seated in the key socket 25 with the other part of the shank disposed in the grooves 19 and in the aperture 24, after which the part 11 is secured firmly into position. The bearing ball 16 forces the shank downwardly into firm engagement with the jaw bearing 18, thus securely holding the handgrip 10 in position on the shank. To detach the shank, it will only be necessary to loosen the part 11 sufficiently to withdraw the shank from the handgrip.

Noting Fig. 3 of the drawing, it will appear that, at right angles to the aperture 24, the walls of the part 12 have other opposed apertures 27, which are not as deep as the aperture 24 and are in alinement with the apertures or recesses 22, thus the shank 23 can be seated in all of the apertures or recesses 22, 27 and, by tightening the top part 11, again the ball 16 will securely retain the shank 23 within the parts 11 and 12, thus firmly supporting the handgrip 10 on the shank.

Handgrips of the type and kind under consideration will facilitate the use of tools of the kind under consideration, provide a better grip for the tool and eliminate objectionable pressures or wear and tear upon the hand. The handgrip is made to fit within the palm of the hand, thus enabling the operator to apply strong pressure in the use of the tool when such pressure is desirable.

Having fully described my invention, what I claim as new and desire to secure by Letters Patent is:

1. A handgrip for tools of the character described, comprising a disc-like body, composed of two cup parts, each part having an annular wall, the wall of one part fitting within the wall of the companion part, interengaging means for adjustably coupling the walls of said parts, one part having a center stud arranged within the annular wall of said part, the other part having, centrally thereof and within its annular wall, a jaw portion, in which the shank of a tool is adapted to be arranged, means on the annular wall of said last named part for receiving and engaging the shank of the tool supported in the jaw of said part, and said stud having, at its end, a bearing member adapted to engage a tool shank supported in said jaw.

2. A handgrip for tools of the character described, comprising a disc-like body, composed of two cup parts, each part having an annular wall, the wall of one part fitting within the wall of the companion part, interengaging means for adjustably coupling the walls of said parts, one part having a center stud arranged within the annular wall of said part, the other part having, centrally thereof and within its annular wall, a jaw portion, in which the shank of a tool is adapted to be arranged, means on the annular wall of said last named part for receiving and engaging the shank of the tool supported in the jaw of said part, said stud having, at its end, a bearing member adapted to engage a tool shank supported in said jaw, said second named means comprising an aperture in one part of the wall, and the opposed portion of said wall having means engaging the end of a tool shank to key the same against movement in said handgrip.

3. A handgrip for tools of the character described, comprising a disc-like body, composed of two parts, each part having an annular wall, the wall of one part fitting within the wall of the companion part, interengaging means for adjustably coupling said parts, one part having a center stud arranged within the annular wall of said part, the other part having centrally thereof and within its annular wall, a jaw portion, in which the shank of a tool is adapted to be arranged, means on the annular wall of said last named part for receiving and engaging the shank of the tool supported in the jaw of said part, said stud having, at its end, a bearing member adapted to engage a tool shank supported in said jaw, said second named means comprising an aperture in one part of the wall, the opposed portion of said wall having means engaging the end of a tool shank to key the same against movement in said handgrip, and said last named keying means comprising a pair of spaced ribs disposed in said wall.

4. A handgrip for tools of the character described, comprising a disc-like body, composed of two cup parts, each part having an annular wall, the wall of one part fitting within the wall of the companion part, interengaging means for adjustably coupling the walls of said parts, said means comprising a threaded engagement between the parts one part having a center stud arranged within the annular wall of said part, the other part having, centrally thereof and within its annular wall, a jaw portion, in which the shank of a tool is adapted to be arranged, means on the annular wall of said last named part for receiving and engaging the shank of the tool supported in the jaw of said part, said stud having, at its end, a bearing member adapted to engage a tool shank supported in said jaw, and said second named means comprising apertures arranged in opposed portions of the wall of the second named part and in alinement with said jaw.

5. A handgrip for tools of the character described, comprising a disc-like body, composed of two cup parts, each part having an annular wall, the wall of one part fitting within the wall of the companion part, interengaging means for adjustably coupling the walls of said parts, said means comprising a threaded engagement between the parts one part having a center stud arranged within the annular wall of said part, the other part having, centrally thereof and within its annular wall, a jaw portion, in which the shank of a tool is adapted to be arranged, means on the annular wall of said last named part for receiving and engaging the shank of the tool supported in the jaw of said part, said stud having, at its end, a bearing member adapted to engage a tool shank supported in said jaw, and said jaw comprising a tubular portion having recesses in opposed walls thereof.

6. A handgrip for tools of the character described, comprising a disc-like body, composed of two cup parts, each part having an annular wall, the wall of one part fitting within the wall of the companion part, interengaging means for adjustably coupling the walls of said parts, said means comprising a threaded engagement between the parts one part having a center stud arranged within the annular wall of said part, the other part having, centrally thereof and within its annular wall, a jaw portion, in which the shank of a tool is adapted to be arranged, means on the annular wall of said last named part for receiving and engaging the shank of the tool supported in the jaw of said part, said stud having, at its end, a bearing member adapted to engage a tool shank supported in said jaw, said jaw comprising a tubular portion having recesses in opposed walls thereof, and said stud having, at its free end, a bearing member adapted to engage a tool shank between said recesses.

7. A handgrip for tools of the character described, comprising a disc-like body, composed of two parts, each part having an annular wall, the wall of one part fitting within the wall of the companion part, interengaging means for adjustably coupling said parts, one part having a center stud arranged within the annular wall of said part, the other part having, centrally thereof and within its annular wall, a jaw portion, in which the shank of a tool is adapted to be arranged, means on the annular wall of said last named part for receiving and engaging the shank of the tool supported in the jaw of said part, said stud having, at its end, a bearing member adapted to engage a tool shank supported in said jaw, said jaw comprising a tubular portion having recesses in opposed walls thereof, said stud having, at its free end, a bearing member adapted to engage a tool shank between said recesses, and said tubular portion having another pair of opposed recesses arranged at right angles to said first named recesses.

8. A handgrip for the shanks of tools of the character described, said handgrip comprising a pair of cup-shaped parts, said parts having threaded engagement for movement toward and from each other, one part having a central stud, the other part having a tubular jaw forming portion arranged in alinement with said stud, said jaw forming portion having two sets of opposed recesses forming two pairs of jaws, the second named part having an annular wall encircling said tubular portion, said wall having two pairs of opposed means for engaging shanks of tools supported in said pairs of jaws, and said stud having means for pressure engaging the tool shanks intermediate the pairs of jaws.

9. A handgrip for the shanks of tools of the character described, said handgrip comprising a pair of cup-shaped parts, said parts having threaded engagement for movement toward and from each other, one part having a central stud, the other part having a tubular jaw forming portion arranged in alinement with said stud, said jaw forming portion having two sets of opposed recesses forming two pairs of jaws, the second named part having an annular wall encircling said tubular portion, said wall having two pairs of opposed means for engaging shanks of tools supported in said pairs of jaws, said stud having means for pressure engaging the tool shanks intermediate the pairs of jaws, and the first named part having a milled peripheral wall encircling said stud.

References Cited in the file of this patent

UNITED STATES PATENTS 591,903   Devore   Oct. 19, 1897